United States Patent
Jaradi et al.

(10) Patent No.: US 12,370,975 B2
(45) Date of Patent: Jul. 29, 2025

(54) SEATBELT GUIDE MECHANISM

(71) Applicant: Ford Global Technologies, LLC, Dearborn, MI (US)

(72) Inventors: Dean M. Jaradi, Macomb, MI (US); Mohammad Omar Faruque, Ann Arbor, MI (US); S. M. Iskander Farooq, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 90 days.

(21) Appl. No.: 18/468,170

(22) Filed: Sep. 15, 2023

(65) Prior Publication Data

US 2025/0091545 A1 Mar. 20, 2025

(51) Int. Cl.
| | |
|---|---|
| *B60R 22/26* | (2006.01) |
| *B60N 2/68* | (2006.01) |
| *B60R 22/18* | (2006.01) |
| *B60R 22/20* | (2006.01) |

(52) U.S. Cl.
CPC .............. *B60R 22/18* (2013.01); *B60N 2/688* (2013.01); *B60R 22/20* (2013.01); *B60R 22/26* (2013.01); *B60R 2022/1818* (2013.01); *B60R 2022/207* (2013.01); *B60R 2022/208* (2013.01)

(58) Field of Classification Search
CPC ......... B60R 22/26; B60R 22/20; B60R 22/18; B60R 22/03; B60R 22/201; B60R 2022/1818; B60R 2022/207; B60R 2022/208; B60R 2022/021; B60N 2/688
USPC .................. 280/808, 801.1, 801.2, 804, 807; 297/468, 473, 474, 475, 481, 483; 180/268; 701/45
See application file for complete search history.

(56) References Cited

U.S. PATENT DOCUMENTS

| | | | |
|---|---|---|---|
| 3,923,321 A * | 12/1975 | Bauer | B60R 22/20 280/806 |
| 5,823,627 A * | 10/1998 | Viano | B60N 2/688 297/483 |
| 6,145,881 A | 11/2000 | Miller, III et al. | |
| 6,276,721 B1 * | 8/2001 | Romeo | B60R 22/19 280/483 |
| 6,474,691 B2 | 11/2002 | Izume et al. | |
| 7,980,635 B2 | 7/2011 | Matsushita | |
| 10,144,387 B1 | 12/2018 | Jaradi et al. | |

(Continued)

FOREIGN PATENT DOCUMENTS

| | | | | |
|---|---|---|---|---|
| CN | 2811077 Y | * | 8/2006 | |
| DE | 102004036360 A1 | * | 3/2006 | ............. B60R 22/03 |

(Continued)

*Primary Examiner* — Keith J Frisby
(74) *Attorney, Agent, or Firm* — Frank A. MacKenzie; Brooks Kushman P.C.

(57) ABSTRACT

A seat system includes a seat having a seatback and an arm supported by the seatback. The arm is extendable from a stowed position to an intermediate position and pivotable in a seat-forward direction from the intermediate position to a deployed position. A webbing guide is fixed to and movable with the arm. The webbing guide is at a top end of the seatback when the arm is at the stowed position and the webbing guide is spaced from the seatback in the seat-forward direction when the arm is at the deployed position. A retractor is supported by the seatback at the top end and a webbing extends from the retractor through the webbing guide.

20 Claims, 8 Drawing Sheets

(56) References Cited

U.S. PATENT DOCUMENTS

| | | | | |
|---|---|---|---|---|
| 11,987,202 B2 * | 5/2024 | Rettig | .................... | B60N 2/688 |
| 2011/0316321 A1 * | 12/2011 | Kujawa | .................. | B60N 2/688 |
| | | | | 297/468 |
| 2016/0207496 A1 * | 7/2016 | Tanabe | .................. | B60R 21/207 |
| 2017/0057459 A1 * | 3/2017 | Kondo | .................... | B60N 2/79 |

FOREIGN PATENT DOCUMENTS

| | | | | | |
|---|---|---|---|---|---|
| DE | 10314464 | B4 | | 5/2007 | |
| JP | 2007045189 | A | | 2/2007 | |
| JP | 2010111294 | A | | 5/2010 | |
| JP | 2016030498 | A | | 3/2016 | |
| JP | 2019202694 | A | * | 11/2019 | |
| KR | 20220046091 | A | | 4/2022 | |
| WO | WO-2018101019 | A1 | * | 6/2018 | ........... B60R 21/015 |

\* cited by examiner

SEATBELT GUIDE MECHANISM

BACKGROUND

A vehicle may include a seatbelt assembly. The seatbelt assembly may include a seatbelt retractor and webbing retractably payable from the seatbelt retractor. The seatbelt assembly may include an anchor coupled to the webbing, a webbing guide, and a latch plate that engages a buckle. The seatbelt assembly may be disposed adjacent to a seat of the vehicle. The webbing may extend continuously from the seatbelt retractor to the anchor. For example, one end of the webbing feeds into the seatbelt retractor, and the other end of the webbing is fixed to the anchor. It is contemplated that future regulatory and technology evolution may allow for safe and permissible use of seat assemblies that are selectively rotatable to different facing positions, and in such examples, the seatbelt assembly may be a seat integrated restraint (SIR) in which various components of the seatbelt assembly, e.g., the retractor and the anchor, are carried by the seat assembly to allow the seat assembly to be rotatable.

DETAILED DESCRIPTION

Figure 1:
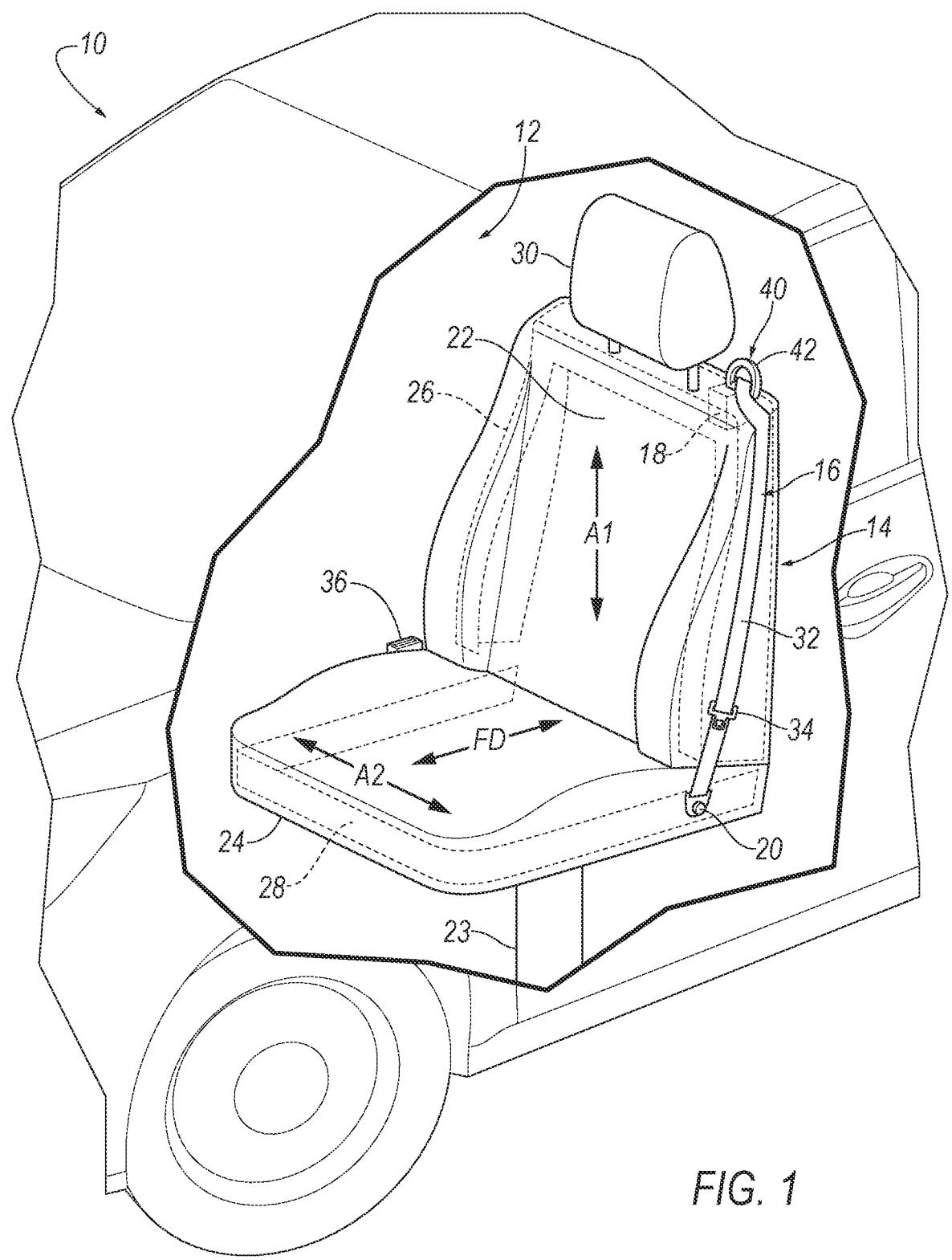
FIG. 1 is a perspective view of a portion of a vehicle with a seat assembly including a seatbelt guide mechanism having an arm in a stowed position.

A seat system includes a seat including a seatback and an arm supported by the seatback. The arm is extendable from a stowed position to an intermediate position and pivotable in a seat-forward direction from the intermediate position to a deployed position. A webbing guide is fixed to and movable with the arm. The webbing guide is at a top end of the seatback when the arm is at the stowed position, and the webbing guide is spaced from the seatback in the seat-forward direction when the arm is at the deployed position. A retractor is supported by the seatback at the top end and a webbing extends from the retractor through the webbing guide.

The seat system may include a linear actuator operatively coupled to the arm to move the arm between the stowed position and the intermediate position. The seat system may include a rotary actuator operatively coupled to the arm to move the arm between the intermediate position and the deployed position. The seat system may include a latch plate slidably disposed on the webbing.

The seat system may include a rack and pinion mechanism coupled to the arm and operative to move the arm between the stowed position and the intermediate position. The rack and pinion mechanism may include a pinion gear and a gear rack, the gear rack being pivotably coupled to the arm. The seat system may include an actuator positioned between the gear rack and the arm to move the arm between the intermediate position and the deployed position. The actuator may be a rotary actuator.

The seat system may include an elongate housing at least partially containing the arm when the arm is in the stowed position. The housing may be positioned inside a top end of the seatback. The housing may carry a linear actuator operatively coupled to the arm to extend the arm between the stowed position and the intermediate position.

The seat system may include a linear actuator operatively coupled to the arm to extend the arm between the stowed position and the intermediate position and a rotary actuator operatively coupled between the linear actuator and the arm to pivot the arm between the intermediate position and the deployed position.

The seat system may include a computer having a processor and a memory storing instructions executable by the processor to activate the linear actuator and the rotary actuator to move the webbing guide from the stowed position to the deployed position in response to determining that an occupant is seated in the seat. The seat system may include a seat bottom, a latch plate slidably disposed on the webbing, and a buckle attached to the seat bottom and operative to releasably engage the latch plate. The memory may store instructions executable by the processor to, after moving the arm to the deployed position, activate the linear actuator and the rotary actuator to return the arm to the stowed position in response to determining that the latch plate is inserted into the buckle. The seat system may include an occupancy sensor.

The seat system may include an elongate housing at least partially containing the arm when the arm is in the stowed position.

With reference to the Figures, where like numerals indicate like features throughout the several views, an example of a seat system having a seat integrated restraint system includes a seat 14 with a seatback 22 and a seat bottom 24 extending in a seat-forward FD direction from the seatback 22. A seatbelt retractor 18 is mounted at a top end of the seatback 22 and an anchor 20 is carried by the seat bottom 24. A seatbelt webbing 32 extends from the seatbelt retractor 18, through a webbing guide 42, and is attached to the anchor 20. The webbing guide 42 is fixed to and movable with an arm 44. The arm 44 is supported by the seatback 22 and is extendable from a stowed position (FIG. 1) to an intermediate position (FIG. 2) and pivotable in a seat-forward direction FD from the intermediate position to a deployed position (FIG. 3). The webbing guide 42 is at a top end of the seatback 22 when the arm 44 is at the stowed position, and the webbing guide 42 is spaced from the seatback in a seat-forward direction when the arm 44 is at the deployed position to present the webbing 32 to an occupant of the seat 14.

With reference to FIG. 1, the vehicle 10 may be any suitable type of ground vehicle, e.g., a passenger or commercial automobile such as a sedan, a coupe, a truck, a sport utility, a crossover, a van, a minivan, a taxi, a bus, etc. The vehicle 10 may define a passenger cabin 12 to house occupants, if any, of the vehicle 10. The passenger cabin 12 may extend across the vehicle 10, e.g., from a left side of the vehicle 10 to a right side of the vehicle 10. The passenger cabin 12 includes a front end and a rear end with the front end being in front of the rear end during forward movement of the vehicle 10.

One or more seat assemblies 14 may be supported in the passenger cabin 12, e.g., by a floor of the vehicle 10. It is contemplated that technology and the regulatory framework may evolve in the future to where use of rotatable seat assemblies becomes safe and permissible and, under such circumstances, the seat assemblies 14 may be rotatably supported by the floor to be selectively rotated to face in different directions of the passenger cabin 12, e.g., the front end, the rear end, the right side, the left side, etc. Only in such examples in which the future regulatory and technology evolution allows for safe and permissible use of seat assemblies 14 that are selectively rotatable to different facing positions, the seatbelt assembly 16 may be a seat-integrated restraint (SIR) in which the components of the seatbelt assembly 16 are carried by the seat assembly 14. For example, the retractor 18 may be fixed to the seatback 22 and the anchor 20 may be carried by the seat bottom 24 of the seat assembly 14 such that the retractor 18 and the anchor 20 rotate with the seatback 22 and the seat bottom 24 as the seat assembly 14 is selectively rotated relative to the floor to face in different directions.

The seat assembly 14 may be supported via a pivot assembly 23 or other suitable structure that allows rotation of the seat assembly 14, including conventional structures. Each seat assembly 14 includes the seatback 22 and the seat bottom 24 that can support the occupant of the seat assembly 14. For example, the occupant of the seat assembly 14 may sit atop a top surface of the seat bottom 24 and recline against the seatback 22.

The seatback 22 may include a seatback frame 26. The seatback frame 26 may include tubes, beams, etc. Specifically, the seatback frame 26 may include a pair of upright frame members. The upright frame members are elongated, and specifically, are elongated in a generally upright direction (e.g., along the seat-vertical axis A1) when the seatback 22 is in a generally upright position. The upright frame members are spaced from each other along the seat-lateral axis A2. The seatback frame 26 may include one or more cross-members extending between the upright frame members.

The seat bottom 24 can include a seat bottom frame 28. The frame 28 may include tubes, beams, etc. Specifically, the seat bottom frame 28 may include a pair of frame members elongated in the seat-forward direction FD, e.g., between a front end and a rear end of the seat bottom 24. The frame members are spaced from each other along the seat-lateral axis A2. The frame 28 may include cross-members extending between the frame members. The cross-members may be elongated along the seat-lateral axis A2. The seat bottom frame 28 can include a seat pan. The seat pan may be generally planar and extend from one of the frame members to the other of the frame members, e.g., along seat-lateral axis A2. The seat pan may be fixed to the frame members.

The seatback frame 26 and the seat bottom frame 28 may be of any suitable plastic material, e.g., carbon fiber reinforced plastic (CFRP), glass fiber-reinforced semi-finished thermoplastic composite (organosheet), etc. As another example, some or all components of the seatback frame 26 and the seat bottom frame 28 may be formed of a suitable metal, e.g., steel, aluminum, etc. The seatback 22 and the seat bottom 24 can include suitable covers. The covers may include upholstery and padding. The upholstery may be cloth, leather, faux leather, or any other suitable material. The upholstery may be stitched in panels around the frames. The padding may be between the upholstery and the frames. The padding may be foam or any other suitable material.

The seatback 22 is supported by the seat bottom 24. The seat bottom 24 extends from the seatback 22 in the seat-forward direction FD of the seat assembly 14. The seatback 22 may be stationary or movable relative to the seat bottom 24. The seatback 22 and the seat bottom 24 may be adjustable in multiple degrees of freedom. Specifically, the seatback 22 and the seat bottom 24 may themselves be adjustable, in other words, adjustable components within the seatback 22 and/or the seat bottom 24, and/or may be adjustable relative to each other.

The seat assembly 14 may include a head restraint 30. The head restraint 30 may be supported by the seatback 22. The head restraint 30 may be at a top end of the seatback 22. The head restraint 30 may be stationary or movable relative to the seatback 22. The seatback 22 and the head restraint 30 may be adjustable in multiple degrees of freedom. Specifically, the seatback 22 and/or the head restraint 30 may themselves be adjustable and/or may be adjustable relative to each other.

Each seat assembly 14 may include a seatbelt assembly 16. As set forth above, it is contemplated that future regulatory and technology evolution may allow for safe and permissible use of seat assemblies 14 that are selectively rotatable to different facing positions, and only in such examples, the seatbelt assembly 16 may be a SIR in which various components of the seatbelt assembly 16, e.g., the retractor 18, the anchor 20, and the webbing guide 42, are carried by the seat assembly 14.

The seatbelt assembly 16 includes the retractor 18 and a webbing 32. The webbing 32 is retractably payable from the retractor 18. The seatbelt assembly 16 may include the anchor 20 fixed to the webbing 32 and a latch plate 34 that engages a buckle 36. The webbing 32 may extend continuously from the retractor 18 through the webbing guide 42 and to the anchor 20. The latch plate 34 may slide freely along the webbing 32, and when engaged with the buckle 36, divide the webbing 32 into a lap belt and a shoulder belt. The webbing 32 may be fabric, e.g., polyester.

In examples in which the seatbelt assembly 16 is a SIR for a seat assembly 14 that is selectively rotatable to face different directions in examples in which contemplated future regulatory and technology evolution allows for such use, as described above, the retractor 18 may be supported by the seatback 22. In other words, in such examples, the weight of the retractor 18 is borne by the seatback 22, and more specifically the seatback frame 26. For example, the frame of the retractor 18 may be fixed to the frame 26 of the seatback 22 via weld, fastener, or other suitable structure. The retractor 18 may be supported by the seatback 22 at the top end as shown.

In the example in which the seatbelt assembly 16 is a SIR, as described above, the webbing guide 42 may be carried by a seatbelt guide mechanism 40 fixed to e.g., the seatback frame 26. The seatbelt guide mechanism 40 can assist the occupant of the seat assembly 14 when fastening the seatbelt assembly 16 by moving the webbing guide 42 in the seat-forward direction FD from a stowed position (FIG. 1) to a deployed position (FIG. 3). When the guide 42 is in the deployed position, the webbing 32 and the latch plate 34 are moved away (seat-forward) from the seatback 22 to a location that may be more easily grasped by the occupant. Once the latch plate 34 is inserted into the buckle 36 the seatbelt guide mechanism 40 returns the webbing guide 42 to the stowed position.

Figure 2:
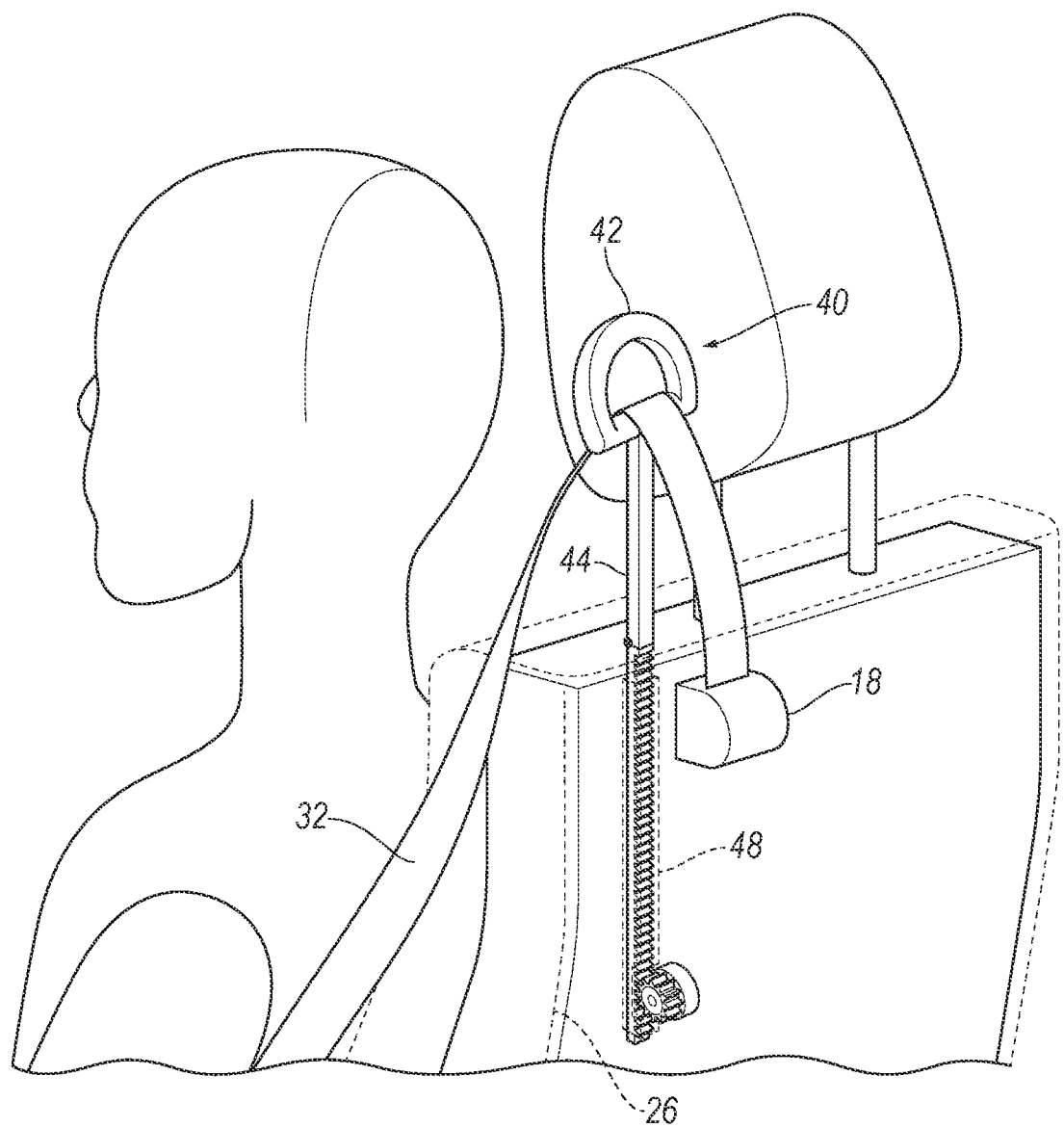
FIG. 2 is a perspective view of the seat back and seatbelt guide mechanism with the arm in an intermediate position.
Figure 3:
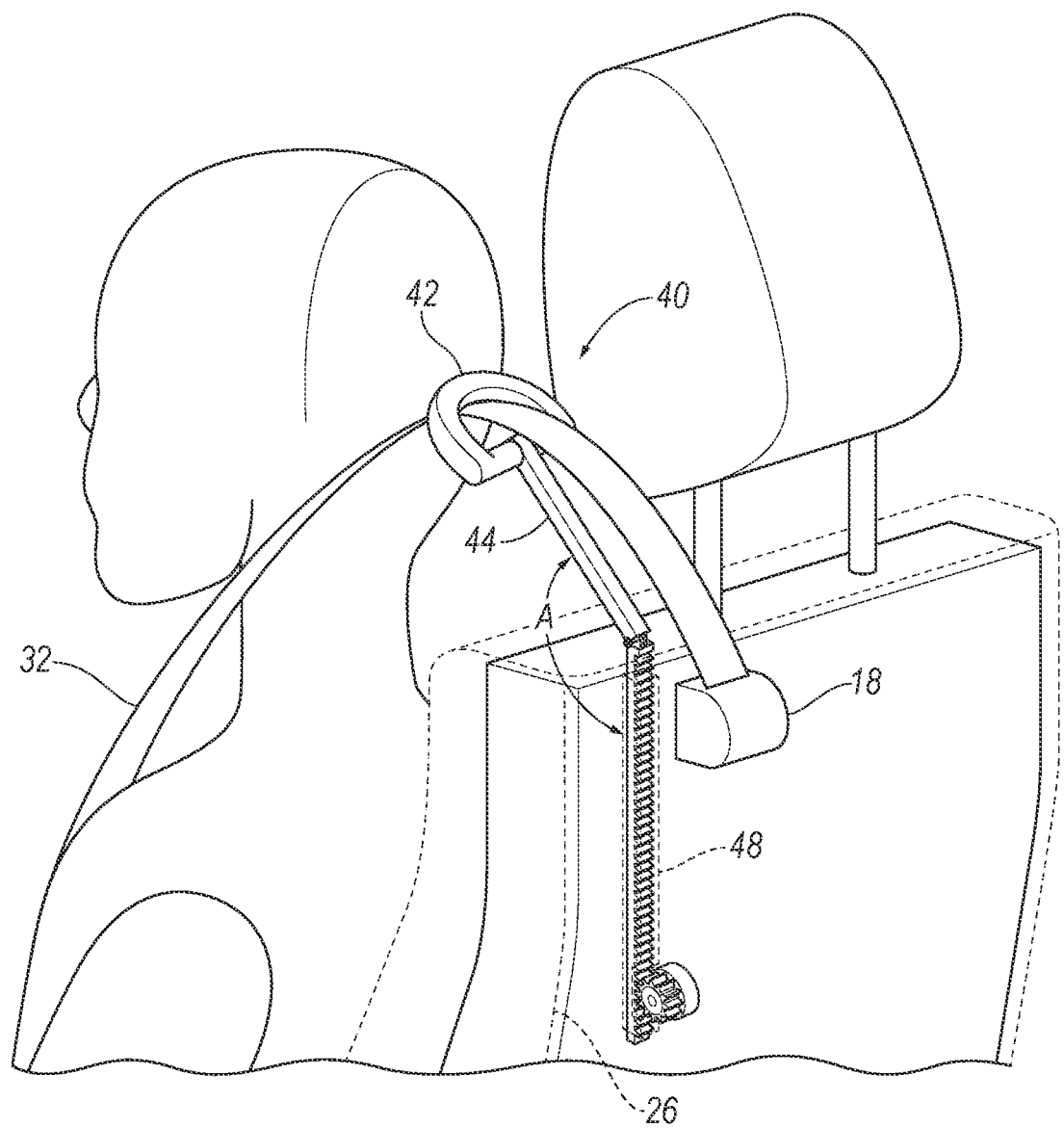
FIG. 3 is a perspective view of the seat back and seatbelt guide mechanism with the arm in a deployed position.

With reference to FIG. 2, the seatbelt anchor mechanism 40 may include an elongate housing 48 extending generally in the seat-vertical direction A1. The housing 48 may be attached to the seatback frame 26 and may be contained within the seatback 22. In other words, the housing 48 may be positioned under the seatback cover's upholstery and padding. The housing 48 may be attached to the seatback frame 26 via weld, fastener, or other suitable structure. The webbing guide 42 is fixed to the guide arm 44, which is extendable in the seat-vertical direction A1. The webbing guide 42 and the guide arm 44 may be immovable relative to each other and move as a unit when raised and lowered. FIG. 2 shows the guide 42 in an intermediate position where the arm 44 is extended upwardly from the housing 48.

With further reference to FIG. 3, the arm 44 is pivotable from the intermediate position (FIG. 2) to the deployed position as shown. The webbing guide 42 is spaced from the seatback 22 in a seat-forward direction when the arm 44 is at the deployed position to present the webbing 32 to an occupant of the seat 14. In an example, the arm 44 may pivot to an angle A of approximately 135 degrees with respect to the housing 48. In another example, the arm 44 may pivot to an angle A of approximately 90 degrees with respect to the housing 48.

Figure 4A:
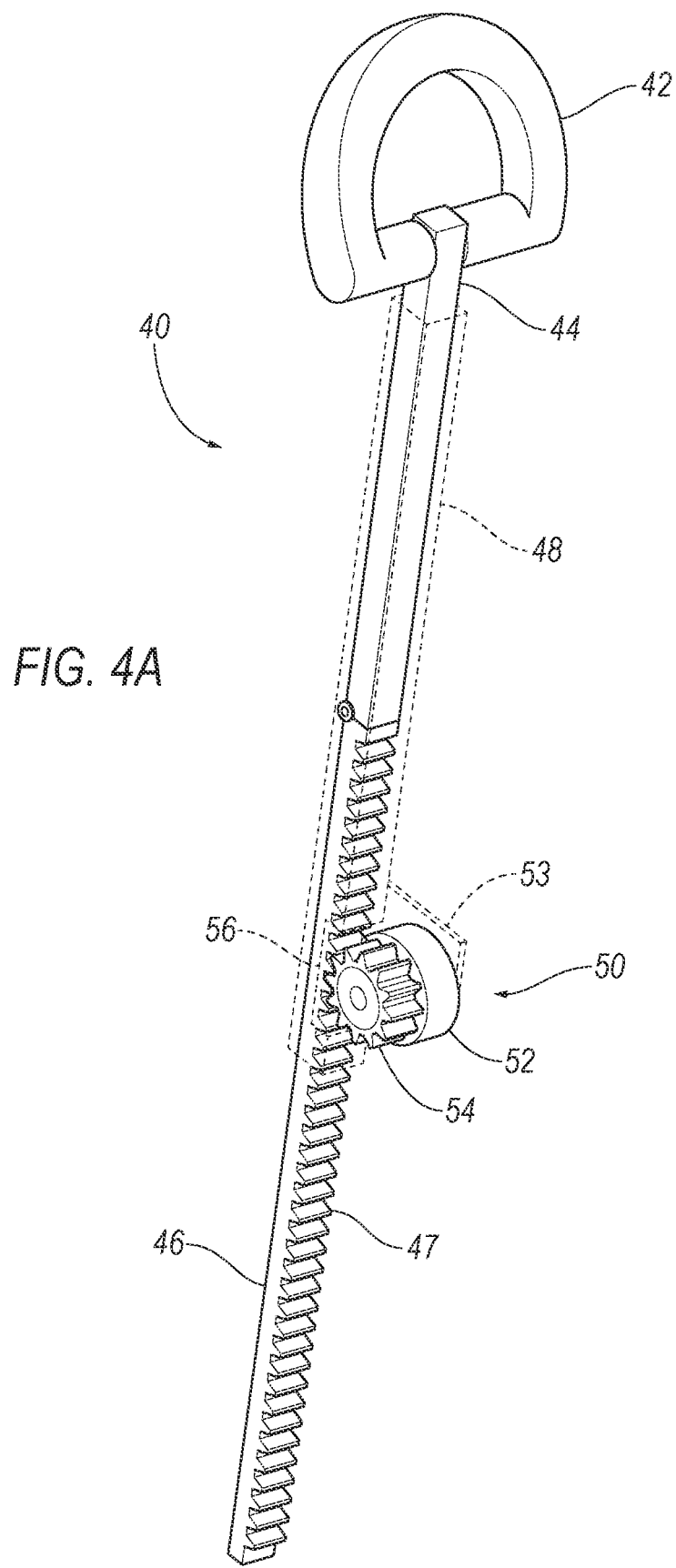
FIG. 4A is a perspective view of the seatbelt guide mechanism with the arm in the stowed position.
Figure 4B:
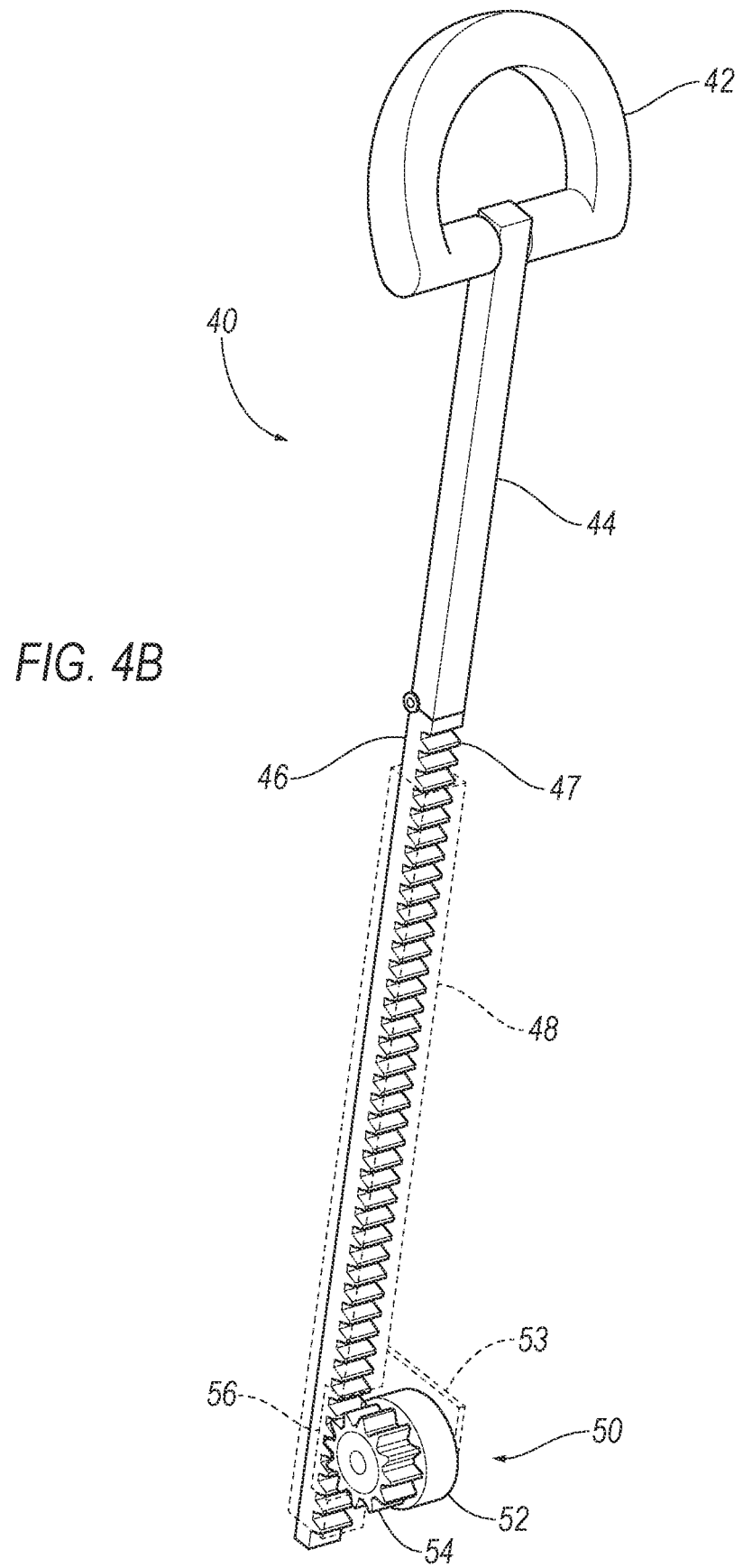
FIG. 4B is a perspective view of the seatbelt guide mechanism with the arm in the intermediate position.

As shown in FIGS. 4A and 4B, the housing 48 carries a linear actuator 50 operatively coupled to the arm 44 to extend the arm 44 between the stowed position (FIG. 4A) and the intermediate position (FIG. 4B). An example seatbelt guide mechanism 40 incorporates a rack and pinion mechanism as the linear actuator 50. The linear actuator 50 may include a gear rack 46, pivotably coupled to the arm 44, and a pinion gear 54 driven by a motor 52, for example. In an example, the motor 52 may be mounted to the housing 48 and the gear rack 46 travels (e.g., slides) inside the housing 48. The housing 48 may be a square tube, for example, and the gear rack 46 may be sized to fit inside the tubular housing. The pinion gear 54 engages teeth 47 on the gear rack 46. The housing may include a notch or opening 56 to provide the pinon gear 54 access to the teeth 47 of the gear rack 46.

The opening 56 may be formed by cutting a sidewall portion of the tubular housing 48 and bending it outward to create a bracket 53 to which the motor 52 may be attached. In other words, in some examples, the bracket 53 is integral with the housing tube 48. Alternatively, the bracket 53 may be a separate element that is fastened, welded, or otherwise secured to the housing 48.

In the stowed position, the gear rack 46 may extend from the housing 48 opposite the arm 44. Alternatively, the housing 48 may be longer to enclose the gear rack 46 when it is in the stowed position. In such an example, the opening 56 may be approximately in the middle of the housing 48, for example. In the stowed position, the arm 44 may be enclosed in the housing 48 as shown in FIG. 4A. In the intermediate position, as shown in FIG. 4B, the arm 44 is extended from the housing 48.

Figure 5A:
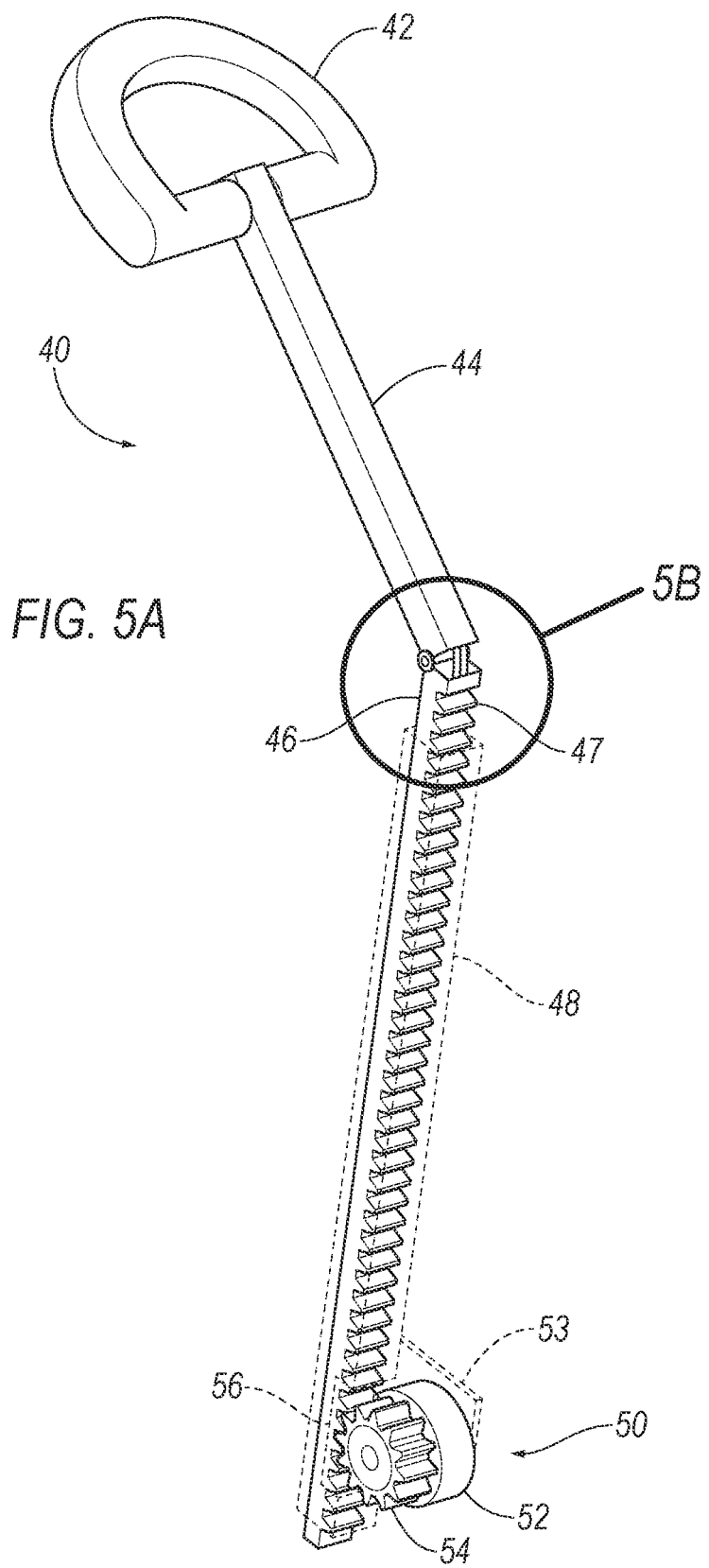
FIG. 5A is a perspective view of the seatbelt guide mechanism with the arm in the deployed position.
Figure 5B:
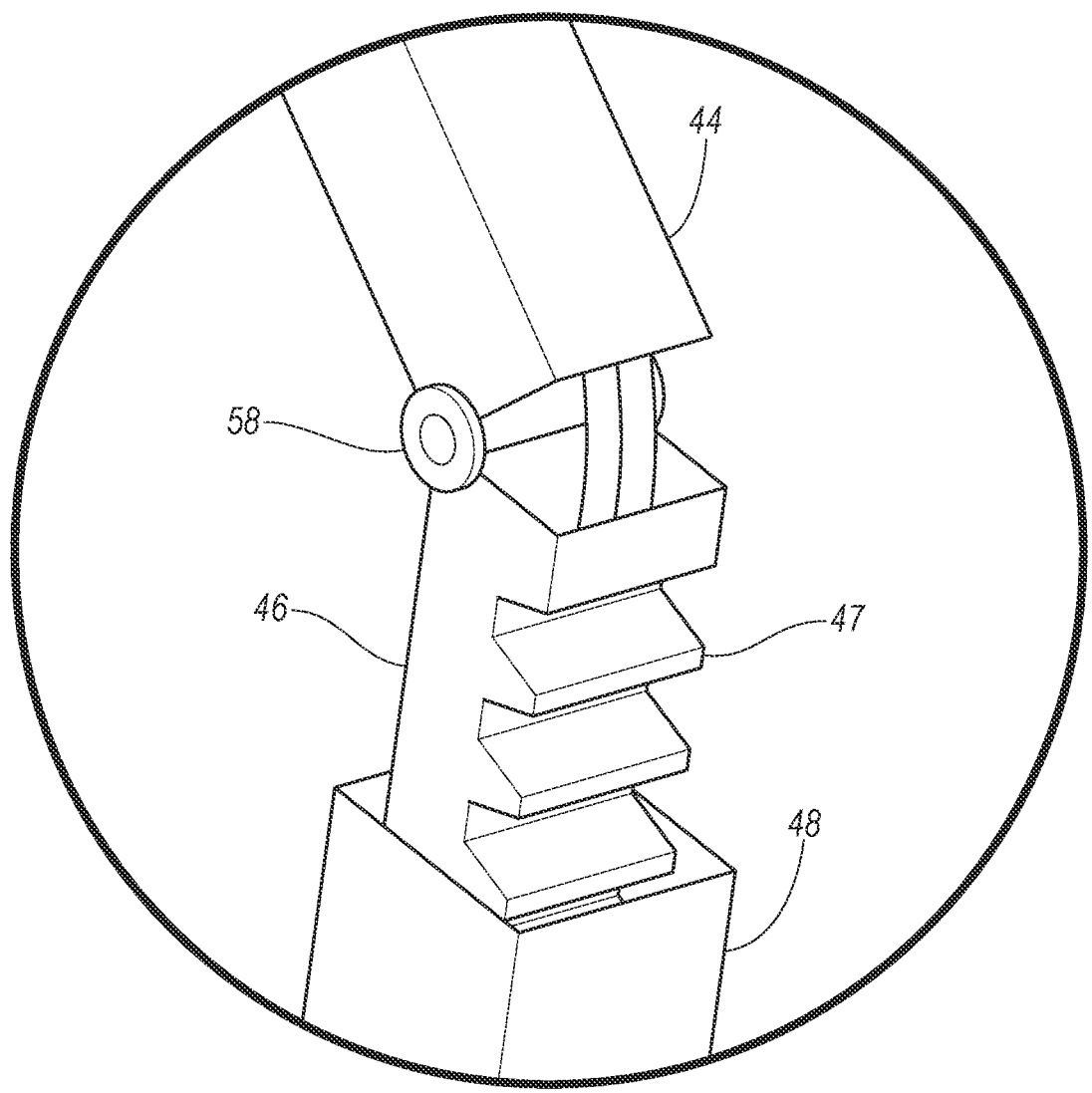
FIG. 5B is a magnified perspective view of the seatbelt guide mechanism having the arm in the deployed position.

With reference to FIG. 5A, once the arm 44 and guide 42 are in the extended intermediate position, the arm 44 may be pivoted in a seat forward direction to the deployed position, as shown. An actuator may be positioned and operatively coupled between the linear actuator 50 and the arm 44 to move the arm 44 between the intermediate position and the deployed position. With further reference to FIG. 5B, the arm 44 may be pivotably coupled to the linear actuator 50, e.g., gear rack 46, via a rotary actuator 58.

Figure 6:
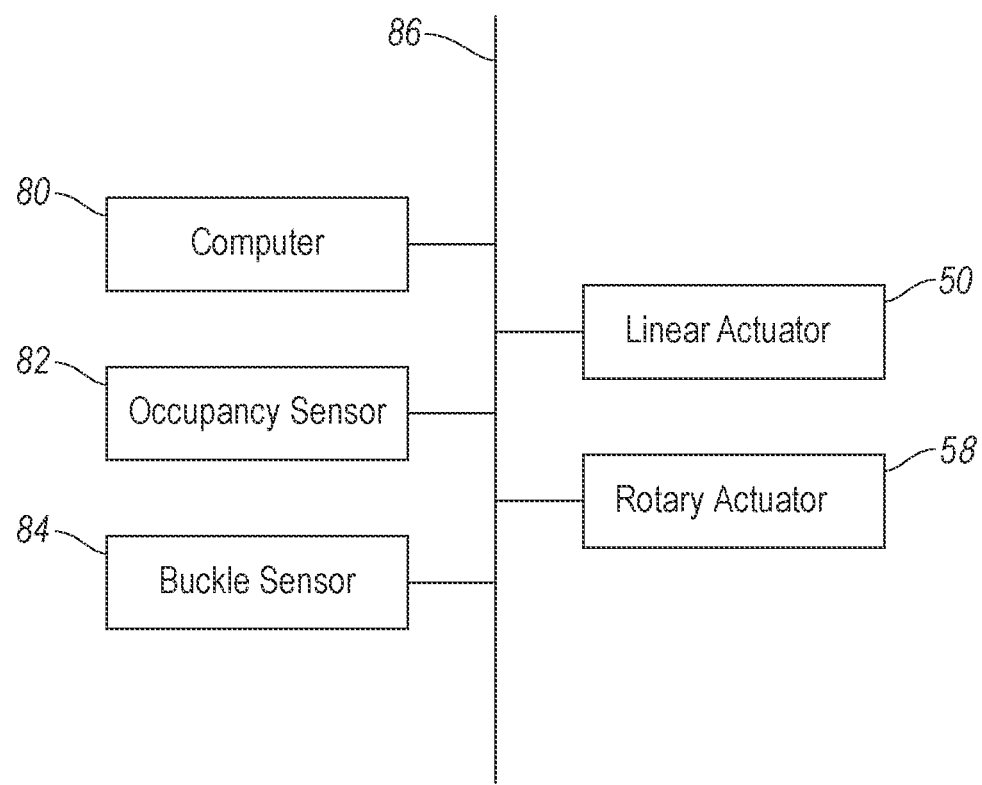
FIG. 6 is a block diagram of a system of the vehicle.

With reference to FIG. 6, a seat system can include the seat assembly 14, the seatbelt assembly 16 (including the seatbelt guide mechanism 40), as well as a computer 80, a network 86, and various sensors, including an occupancy sensor 82 and a buckle sensor 84. The vehicle 10 may include an occupancy sensor 82 configured to detect occupancy of the seat assembly 14. The occupancy sensor 82 may include visible-light or infrared cameras directed at the seat, weight sensors supported by the seat bottom 24, or other suitable structure, including those conventionally known. The occupancy sensor 82 provides data to the computer 80 indicating whether the seat assembly 14 is occupied or unoccupied.

The vehicle 10 may include a buckle sensor 84 that detects engagement of the latch plate 34 of the seatbelt assembly 16 with the buckle 36. The buckle sensor 84 may include a switch, a contact sensor, a hall effect sensor, or any other suitable structure for detecting engagement of the latch plate 34 with the buckle 36, including conventional structures. The buckle sensor 84 provides data to the computer 80 indicating whether the latch plate 34 is engaged with, or disengaged from, the buckle 36.

The vehicle 10 may include a communication network 86. The communication network 86 includes hardware, such as a communication bus, for facilitating communication among vehicle 10 components, e.g., the computer 80, the occupancy sensor 82, the buckle sensor 84, the linear actuator 50, the rotary actuator 58, etc. The communication network 86 may facilitate wired or wireless communication among the vehicle 10 components in accordance with a number of communication protocols such as controller area network (CAN), Ethernet, Wi-Fi, Local Interconnect Network (LIN), and/or other wired or wireless mechanisms. Alternatively or additionally, in cases where the computer 80 comprises a plurality of devices, the communication network 86 may be used for communications between devices represented as the computer 80 in this disclosure.

The computer 80 may be a microprocessor-based computer implemented via circuits, chips, or other electronic components. The computer 80 includes a processor, a memory, etc. The memory of the computer 80 may include memory for storing programming instructions executable by the processor as well as for electronically storing data and/or databases. For example, the computer 80 can be a generic computer with a processor and memory as described above and/or may include an electronic control unit (ECU) or controller for a specific function or set of functions, and/or a dedicated electronic circuit including an ASIC that is manufactured for a particular operation, e.g., an ASIC for processing sensor data and/or communicating the sensor data. As another example, the computer 80 may be a restraints control module. In another example, computer 80 may include an FPGA (Field-Programmable Gate Array) which is an integrated circuit manufactured to be configurable by a user. Typically, a hardware description language such as VHDL (Very High-Speed Integrated Circuit Hardware Description Language) is used in electronic design automation to describe digital and mixed-signal systems such as FPGA and ASIC. For example, an ASIC is manufactured on VHDL programming provided pre-manufacturing, whereas logical components inside an FPGA may be configured based on VHDL programming, e.g., stored in a memory electrically connected to the FPGA circuit. In some examples, a combination of processor(s), ASIC(s), and/or FPGA circuits may be included in the computer 80. The memory can be of any type, e.g., hard disk drives, solid state drives, servers, or any volatile or non-volatile media. The memory can store the collected data sent from the sensors.

The computer 80 is programmed to, i.e., the memory stores instructions executable by the processor to, command the linear actuator 50 to move the webbing guide 42 from the stowed position to the extended intermediate position, and to command the rotary actuator 58 to move the guide 42 from the intermediate position to the deployed position. The computer 80 may move the guide 42 by sequentially transmitting commands to the linear actuator 50 and the rotary actuator 58 via the communication network 86. The commands may specify the stowed position, the intermediate position, or the deployed position.

The computer 80 may be programmed to move the guide 42 to the deployed position in response to detecting that the seat assembly 14 is occupied. The computer 80 may determine that the seat assembly 14 is occupied based on information received from the occupancy sensor 82 via the communication network 86. For example, upon receiving information from the occupancy sensor 82 indicating that the seat assembly 14 has gone from being unoccupied to being occupied, the computer 80 may transmit a command to the linear actuator 50 specifying movement of the guide 42 to the intermediate position and transmit a command to the rotary actuator 58 specifying movement of the guide 42 to the deployed position.

The computer 80 may be programmed to move the guide 42 to the stowed position in response to detecting that the latch plate 34 is engaged with the buckle 36 of the seat assembly 14. The computer 80 may determine that the latch plate 34 is engaged with the buckle 36 based on information received from the buckle sensor 84 via the communication network 86. For example, upon receiving information from the buckle sensor 84 indicating that the latch plate 34 has gone from being disengaged from the buckle 36 to engaged with the buckle 36, the computer 80 may transmit a command to the rotary actuator 58 specifying movement of the guide 42 to the intermediate position and transmit a command to the linear actuator 50 specifying movement (e.g., retracting arm 44) of the guide 42 to the stowed position.

Computing devices, such as the computer, generally include computer-executable instructions, where the instructions may be executable by one or more computing devices such as those listed above. Computer-executable instructions may be compiled or interpreted from computer programs created using a variety of programming languages and/or technologies. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory.

The adjectives first, second, etc., are used throughout this document as identifiers and, unless explicitly stated otherwise, are not intended to signify importance, order, or quantity.

Use of in "response to," "based on," and "upon determining" herein indicates a causal relationship, not merely a temporal relationship.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A seat system, comprising:
   a seat including a seatback;
   an arm supported by the seatback and extendable from a stowed position to an intermediate position and pivotable in a seat-forward direction from the intermediate position to a deployed position;
   a webbing guide fixed to and movable with the arm, the webbing guide being at a top end of the seatback when the arm is at the stowed position, and the webbing guide being spaced from the seatback in the seat-forward direction when the arm is at the deployed position;
   a retractor supported by the seatback at the top end; and
   a webbing extending from the retractor through the webbing guide.

2. The seat system of claim 1, further comprising a linear actuator operatively coupled to the arm to move the arm between the stowed position and the intermediate position.

3. The seat system of claim 2, further comprising a rotary actuator operatively coupled to the arm to move the arm between the intermediate position and the deployed position.

4. The seat system of claim 1, further comprising a rotary actuator operatively coupled to the arm to move the arm between the intermediate position and the deployed position.

5. The seat system of claim 1, further comprising a rack and pinion mechanism coupled to the arm and operative to move the arm between the stowed position and the intermediate position.

6. The seat system of claim 5, wherein the rack and pinion mechanism comprises a pinion gear and a gear rack, the gear rack being pivotably coupled to the arm.

7. The seat system of claim 6, further comprising an actuator positioned between the gear rack and the arm to move the arm between the intermediate position and the deployed position.

8. The seat system of claim 7, wherein the actuator is a rotary actuator.

9. The seat system of claim 1, further comprising a latch plate slidably disposed on the webbing.

10. The seat system of claim 1, further comprising an elongate housing at least partially containing the arm when the arm is in the stowed position.

11. The seat system of claim 10, wherein the housing is positioned inside the top end of the seatback.

12. The seat system of claim 11, wherein the housing carries a linear actuator operatively coupled to the arm to extend the arm between the stowed position and the intermediate position.

13. The seat system of claim 1, further comprising a linear actuator operatively coupled to the arm to extend the arm between the stowed position and the intermediate position and a rotary actuator operatively coupled between the linear actuator and the arm to pivot the arm between the intermediate position and the deployed position.

14. The seat system of claim 13, further comprising a computer having a processor and a memory storing instructions executable by the processor to activate the linear actuator and the rotary actuator to move the webbing guide from the stowed position to the deployed position in response to determining that an occupant is seated in the seat.

15. The seat system of claim 14, further comprising a seat bottom, a latch plate slidably disposed on the webbing, and a buckle attached to the seat bottom and operative to releasably engage the latch plate.

16. The seat system of claim 15, wherein the memory stores instructions executable by the processor to, after moving the arm to the deployed position, activate the linear actuator and the rotary actuator to return the arm to the stowed position in response to determining that the latch plate is inserted into the buckle.

17. The seat system of claim 16, further comprising an occupancy sensor.

18. The seat system of claim 14, further comprising an elongate housing at least partially containing the arm when the arm is in the stowed position.

19. The seat system of claim 18, wherein the housing is positioned inside the top end of the seatback.

20. The seat system of claim 19, wherein the housing carries the linear actuator.

\* \* \* \* \*